United States Patent [19]

Mieville

[11] 4,240,934

[45] Dec. 23, 1980

[54] REFORMING CATALYST COMPRISING IRIDIUM, ZIRCONIA, AND ALUMINA

[75] Inventor: Rodney L. Mieville, Glen Ellyn, Ill.

[73] Assignee: Standard Oil Company (Indiana), Chicago, Ill.

[21] Appl. No.: 946,500

[22] Filed: Sep. 28, 1978

[51] Int. Cl.³ .................. B01J 21/04; B01J 21/06; B01J 23/46
[52] U.S. Cl. .................. 252/466 PT; 208/138
[58] Field of Search .................. 252/466 PT; 208/138

[56] References Cited

U.S. PATENT DOCUMENTS

| | | | |
|---|---|---|---|
| 3,617,520 | 11/1971 | Kluksdahl | 252/466 PT |
| 3,883,419 | 5/1975 | Itoh et al. | 252/466 PT |
| 3,943,050 | 3/1976 | Bertolacini et al. | 208/138 X |
| 4,076,792 | 2/1978 | Foster et al. | 252/466 PT |

*Primary Examiner*—W. J. Shine
*Attorney, Agent, or Firm*—James L. Wilson; William T. McClain; William H. Magidson

[57] ABSTRACT

There is disclosed a catalyst for the reforming of hydrocarbon streams. This catalyst comprises iridium as a hydrogenation component on a support of zirconia and alumina. The support comprises zirconia in an amount of about 3 wt. % to about 15 wt. % zirconia or at least 60 wt. % zirconia. The iridium is present in an amount of about 0.05 wt. % to about 1.5 wt. %, calculated as the metal and based upon the total weight of the catalyst.

Also disclosed is a reforming process, which process comprises contacting a hydrocarbon stream in a reaction zone under reforming conditions and in the presence of hydrogen with the above-described catalyst.

4 Claims, 1 Drawing Figure

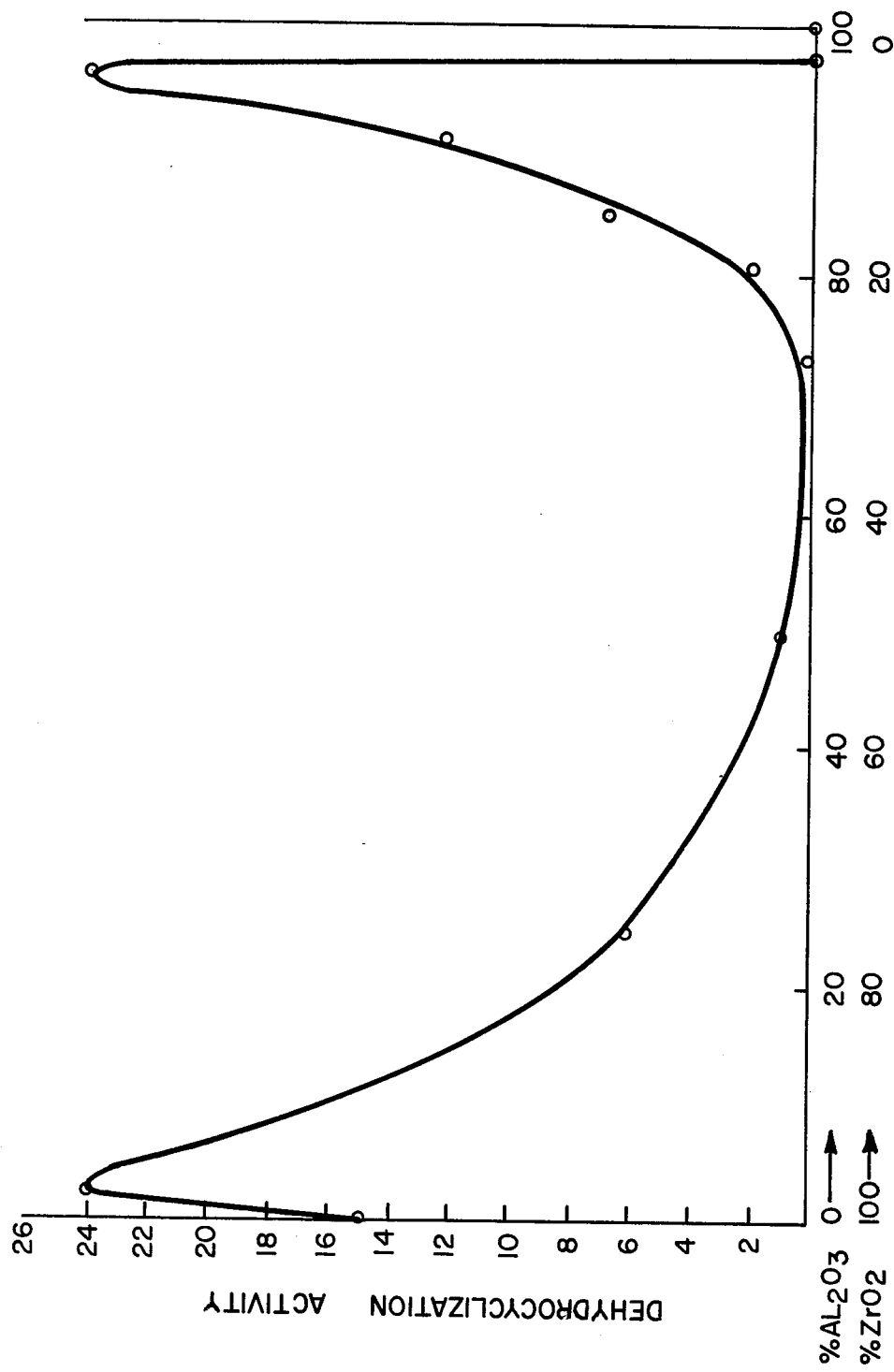

REFORMING CATALYST COMPRISING IRIDIUM, ZIRCONIA, AND ALUMINA

BACKGROUND OF THE INVENTION

It is well known that hydrocarbon distillates can be reformed in the presence of catalysts containing one or more Group VIII noble metals. Until recently, the preferred Group VIII noble metal has been platinum. Typical platinum reforming catalysts comprise platinum, a halogen, a promoter such as rhenium, and a refractory inorganic support material, such as a catalytically active alumina.

Webb, in U.S. Pat. No. 2,848,377, discloses the use of a catalyst containing platinum (about 0.01 to 1 wt.%) and iridium (about 0.01 to 1 wt.%) on alumina for the conversion of hydrocarbons, e.g., the reforming of petroleum naphthas. The catalyst can also contain about 0.1 to 10 wt.% of a cracking adjuvant, such as silica or a halogen.

Kearby, in U.S. Pat. No. 2,708,187, teaches the addition of a stabilizing oxide in the form of a protective colloid, such as the hydrated oxides of chrominum, zirconium, thorium, titanium, or iron, to a catalyst containing a Group VIII noble metal, such as platinum, palladium, rhodium, and iridium, on a catalyst support, such as alumina. This addition can markedly reduce the crystal growth tendency of amorphous or colloidal Group VIII noble metal deposited on the surface of the catalyst support and the resulting catalyst can withstand repeated oxidative regenerations without marked activity loss.

Bertolacini, et al., in U.S. Pat. No. 3,943,050, disclose the use of a catalyst comprising a Group VIII noble metal and a small amount of zirconium (about 0.05 wt.% to about 5 wt.% zirconium calculated as the element) on a porous refractory inorganic oxide, such as alumina, as the second catalyst in a two-catalyst process for the reforming of hydrocarbon streams.

Buss, in U.S. Pat. No. 3,554,902; Sinfelt, et al., in U.S. Pat. No. 3,850,747; Sinfelt, et al., in U.S. Pat. No. 3,835,034; Paynter, et al., U.S. Pat. No. 3,950,270; Sinfelt, in U.S. Pat. No. 3,956,190; and Sinfelt, et al., in U.S. Pat. No. 4,018,670, disclose reforming with catalysts comprising platinum and/or iridium on a support comprising one or more refractory inorganic oxides, such as alumina, silica, and zirconia.

Now it has been found that a catalyst comprising iridium, zirconia, and alumina and having the zirconia present in specific amounts provides an improved catalyst for the reforming of naphthas and hydrocarbon streams boiling in the gasoline boiling range.

SUMMARY OF THE INVENTION

Broadly, according to the present invention, there is provided a catalyst for the reforming of hydrocarbon streams, which catalyst comprises iridium as a hydrogenation component on a support of zirconia and alumina, said support comprising about 3 wt.% to about 15 wt.% zirconia or at least 60 wt.% zirconia. Preferably, the support comprises from about 3 wt.% to about 10 wt.% zirconia or at least 90 wt.% zirconia. The iridium is present in an amount of about 0.05 wt.% to about 1.5 wt.%, calculated on the metal and based upon the weight of the catalyst.

There is also provided a process for the reforming of a hydrocarbon stream, which process comprises contacting the stream in a reaction zone under reforming conditions and in the presence of hydrogen with the above catalyst. The reforming conditions comprise an average catalyst bed temperature of about 427° C. (800° F.) to about 566° C. (1,050° F.), a pressure of about 446 kPa (50 psig) to about 4,928 kPa (700 psig), a hydrogen recycle rate of about 178 m$^3$/m$^3$ (1,000 SCFB) to about 2,136 m$^3$/m$^3$ (12,000 SCFB), [gas volumes are measured at 15.6° C. and 101 kPa] a weight hourly space velocity (WHSV) of about 0.5 weight unit of hydrocarbon per hour per weight unit of catalyst to about 10 weight units of hydrocarbon per hour per weight unit of catalyst, and a mole ratio of hydrogen-to-hydrocarbon of about 1 to about 50.

BRIEF DESCRIPTION OF THE ACCOMPANYING DRAWING

The accompanying figure presents dehydrocyclization activity of a catalyst comprising iridum and a support of zirconium oxide and alumina as a function of the amount of zirconium oxide in the support of that catalyst.

DETAILED DESCRIPTION OF THE INVENTION

The process of the present invention is a process for the reforming of naphthas or hydrocarbon streams boiling in the gasoline boiling range. Reforming processes provide high-octane-number hydrocarbon blending components for gasoline. In the typical reforming process, various reactions take place. These reactions include dehydrogenation, isomerization and hydrocracking. Examples of the dehydrogenation reactions are the dehydrogenation of naphthenes to aromatics, the dehydroisomerization of alkylcycloheptanes to aromatics, the dehydrogenation of paraffins to olefins, and the dehydrocyclization of paraffins and olefins to aromatics. Examples of isomerization reactions are the isomerization of normal-paraffins and olefins to isoparaffins, the hydroisomerization of olefins to isoparaffins, the isomerization of alkylcyclopentanes to cyclohexanes, and the isomerization of substituted aromatics. Examples of hydrocracking reactions are hydrodesulfurization and the hydrocracking of paraffins. Adequate discussions of the reactions that occur in a reforming reaction zone are presented in PETROLEUM PROCESSING, R. J. Hengstebeck, McGraw-Hill Book Co., Inc., 1959, pp. 179–184, and in CATALYSIS, Vol. VI, P. H. Emmett, Editor, Reinhold Publishing Corp., 1958, pp. 497–498.

Various catalysts can be employed to reform naphthas and hydrocarbon streams that boil in the gasoline boiling range. Among these catalysts are molybdenum-oxides-on-alumina catalysts, chromium oxides-on-alumina catalysts, platinum-halogen-on-alumina catalysts, and platinum-aluminosilicate-material-alumina catalysts. Generally, those catalysts that contain platinum as a hydrogenation component are the catalysts that are used today in the reforming processes of the petroleum refining industry.

Bi-metallic catalysts are now being employed by the petroleum refining industry in many reforming processes. An example of a bi-metallic catalyst is a catalyst that contains platinum and rhenium on a suitable support, such as alumina.

Today, much interest has been shown in the reforming of naphthas and hydrocarbon streams containing hydrocarbons boiling in the gasoline boiling range in the presence of catalysts containing as a hydrogenation conponent either iridium or a combination of platinum and iridium on a suitable support material. Furthermore, the use of a support material comprising more than one refractory inorganic oxide has been contemplated. An example of a support material containing more than one refractory inorganic oxide is one made up of zirconia (zirconium oxide) and alumina. Now it has been found unexpectedly that an iridum-containing catalyst that has a support of zirconia and alumina will provide exceptionally good reforming results, if that support material contains its zirconia in certain amounts. The zirconia should be present either in an amount within the range of 3 wt.% to about 15 wt.% or in an amount of at least 60 wt.% zirconia.

Broadly, according to the present invention, there is provided a catalyst for the reforming of hydrocarbon streams, such as naphthas and hydrocarbon streams boiling within the gasoline boiling range, which catalyst comprises iridium as a hydrogenation component on a support of zirconia and alumina, said support comprising about 3 wt.% to about 15 wt.% zirconia or at least 60 wt.% zirconia.

The hydrogenation component of the catalyst of the present invention comprises iridium. Iridium is present in an amount of about 0.05 wt.% to about 1.5 wt.%, calculated as the metal and based upon the weight of the catalyst. Preferably, the iridium is present in an amount of about 0.1 wt.% to about 1 wt.%, calculated as the metal and based upon the weight of the catalyst.

The support of the catalyst that is employed in the process of the present invention comprises a specified amount ot zirconia and a refractory inorganic oxide. Suitably, the other refractory inorganic oxide is a catalytically active alumina, which can be either a gamma-alumina, or an eta-alumina, or both.

The alumina should have an average pore diameter of about 7 nm (70 Angstroms [Å]) to about 20 nm (200 Å), or larger. The alumina should have a surface area of at least 150 m$^2$/gm. Suitably, the surface area should be within the range of about 200 m$^2$/gm to about 800 m$^2$/gm, or larger.

The support material comprising zirconia and the other refractory inorganic oxide, such as alumina, is typically prepared by blending an aqueous solution of a zirconyl compound in a slurry of an alumina hydrosol or hydrogel, gelling the blend by addition of a dilute solution of ammonium hydroxide until a pH of 8 is attained, and then heating the resulting mixture to a temperature of about 80° C. (176° F.) with continual stirring for at least 1 hour. The mixture is filtered, washed with water, and calcined for 3 hours at 500° C. (932° F.). A zirconia-alumina composition is obtained. Please note that other conventional methods may be employed to prepare a zirconia-alumina support.

Typically, the iridium component can be introduced into the catalytic composition by impregnation of the support material with a solution of a heat-decomposable compound of iridium. Impregnation techniques are well known to those skilled in the art and, therefore, will not be discussed further.

The support material of the catalyst is a support of zirconia and another refractory inorganic oxide, such as alumina, the support comprising about 3 wt.% to about 15 wt.% zirconia or at least 60 wt.% zirconia. Therefore, the support comprises from about 3 wt.% to about 15 wt.% zirconia or from about 60 wt.% to about 100 wt.% zirconia. Preferably, the support comprises from about 3 wt.% to about 10 wt.% zirconia or at least 90 wt.% zirconia. Hence, the support comprises preferably from about 3 wt.% to about 10 wt.% zirconia or from about 90 wt.% to 100 wt.% zirconia. Suitable supports comprising zirconia and alumina can be obtained commercially, e.g., from the Harshaw Chemical Company.

The hydrocarbon feedstock that is to be reformed in the presence of the iridium-zirconia-containing catslyst is a naphtha or a hydrocarbon stream that boils in the gasoline boiling range. Typically, examples of such feedstocks are a virgin naphtha, a cracked naphtha, or mixtures thereof, and hydrocarbon streams boiling in the range of about 21° C. (70° F.) to about 260° C. (500° F.), and preferably within the range of about 82° C. (180° F.) to about 204° C. (400° F.). Such a feedstock may contain sulfur in an amount greater than 10 ppm. Therefore, it is hydrodesulfurized to reduce this sulfur level to a value that is less than 5 ppm, advantageously, less than 2 ppm, and, preferably, less than 1 ppm sulfur.

The hydrodesulfurization is accomplished by mixing the hydrocarbon stream with a hydrogen-rich gas to form a gas-hydrocarbon mixture and passing the mixture into a hydrodesulfurization zone to be contacted with a suitable hydrodesulfurization catalyst at a temperature of about 260° C. (500° F.) to about 427° C. (800° F.), a hydrogen partial pressure of about 345 kPa (50 psia) to about 2,758 kPa (400 psia), a liquid hourly space velocity (LHSV) of about 1 volume of hydrocarbon per hour per volume of catalyst to about 10 volumes of hydrocarbon per hour per volume of catalyst, and a hydrogen-to-hydrocarbon ratio of about 17.8 m$^3$/m$^3$ (100 standard cubic feet of hydrogen per barrel of hydrocarbon [SCFB]) to about 356m$^3$/m$^3$ (2,000 SCFB).

Any suitable hydrodesulfurization catalyst can be employed in the hydrodesulfurization zone. Such catalyst comprises a hydrogenation component supported on a refractory inorganic oxide support having little or no cracking activity. The hydrogenation component can comprise a Group VI-B metal and/or a Group VIII metal of the Periodic Table of Elements shown on p. 628 of WEBSTER's SEVENTH NEW COLLEGIATE DICTIONARY, G. and C. Merriam Company, Springfield, Mass., U.S.A. (1963). Typical Group VI-B metals are molybdenum and tungsten; typical Group VIII metals are cobalt and nickel. A preferred hydrogenation component one or more members of the group consisting of cobalt and molybdenum, nickel and molybdenum, nickel and tungsten, their oxides, their sulfides, and mixtures thereof. Any suitable refractory inorganic oxide, being neutral or weakly acidic, can be employed as a support for this hydrodesulfurization catalyst, such as silica gel, alumina, and silica-stabilized alumina. A typical support is a catalytically active alumina, which may be either a gamma-alumina, or an eta-alumina, or both. The properties of such an alumina are mentioned hereinabove.

A typical hydrodesulfurization catalyst is prepared by adding a suitable compound of each metal of the hydrogenation component to a sol or gel of the refractory inorganic oxide. This composition is thoroughly blended and the sol or gel mixture is co-gelled subsequently by the addition of dilute ammonia. Then the resulting co-gelled material is dried and calcined. Alternately, the refractory inorganic oxide is gelled, dried, pelleted, calcined, and cooled. The resulting material is then impregnated with a solution or solutions containing the metal or metals of the hydrogenation component. Suitable calcination conditions comprise a temperature in the range of about 482° C. (900° F.) to about 593° C. (1,100° F.) and a calcination time of about 1 to about 20 hours. Suitable drying conditions comprise a temperature of about 93° C. (200° F.) to about 204° C. (400° F.) and a drying time of about 3 hours to about 30 hours. Preferably, drying conditions comprise a temperature of about 121° C. (250° F.) for about 8 hours to about 16 hours and calcination conditions comprise a temperature of about 538° C. (1,000° F.) for about 2 hours to about 6 hours.

After long periods of use, the catalyst employed in the naphtha-hydrodesulfurization zone becomes deactivated and is regenerated by burning the carbonaceous deposits therefrom with an oxygen-containing gas pursuant to typical catalyst regeneration techniques well known to those skilled in the art.

The desulfurized hydrocarbon stream is then sent to an appropriate heating means and then introduced into the reactor section of the reforming unit. Such a reactor section may be made up of one or more reactors containing fixed beds of catalyst, or it may be a fluidized bed of catalyst, or it may be a moving bed of catalyst.

The operating conditions for the reforming reaction zone comprise an average catalyst bed temperature within the range of about 427° C. (800° F.) to about 538° C. (1,000° F.), a pressure within the range of about 446 kPa (50 psig) to about 4,928 kPa (700 psig), a hydrogen recycle rate within the range of about 267 $m^3/m^3$ (1,500 SCFB) to about 2,136 $m^3/m^3$ (12,000 SCFB), a WHSV within the range of about 0.5 weight unit of hydrocarbon per hour per weight unit of catalyst to about 10 weight units of hydrocarbon per hour per weight unit of catalyst, and a hydrogen-to-hydrocarbon mole ratio within the range of about 1 to about 50. Preferred operating conditions comprise an average catalyst bed temperature within the range of about 454° C. (850° F.) to about 524° C. (975° F.), a pressure within the range of about 1,136 kPa (150 psig) to about 3,204 kPa (450 psig), a hydrogen recycle rate within the range of about 801 $m^3/m^3$ (4,500 SCFB) to about 1,780 $m^3/m^3$ (10,000 SCFB), a WHSV within the range of about 2 weight units of hydrocarbon per hour per weight unit of catalyst to about 5 weight units of hydrocarbon per hour per weight unit of catalyst, and a hydrogen-to-hydrocarbon mole ratio within the range of about 10 to about 30.

Effluent from the reactor section is cooled and separated into a hydrogen-containing gas and a liquid product, the hydrogen-containing gas being employed as recycle gas and the liquid product being sent to appropriate product recovery equipment.

After a period of time, the reforming catalyst that is employed in the process of the present invention will have become deactivated and can be regenerated by burning the carbonaceous deposits therefrom with an oxygen-containing gas pursuant to typical catalyst regeneration techniques that are well known to those skilled in the art.

It is contemplated that another embodiment of the process of the present invention is a two-catalyst process which comprises contacting a hydrocarbon stream in a first reaction zone under reforming conditions and in the presence of hydrogen with a first reforming catalyst comprising a Group VIII noble metal, a halogen, and a refractory inorganic oxide to obtain a first effluent and contacting said first effluent in a second reaction zone under reforming conditions and in the presence of hydrogen with the catalyst of the present invention to obtain a second effluent. The first reforming catalyst can include rhenium or gallium as a promoter.

The following examples are presented to facilitate a better understanding of the present invention. They are presented for the purpose of illustration only and are not intended to limit the scope of the present invention.

EXAMPLE I

Ten catalysts were prepared. One, hereinafter identified as Catalyst A, had a support of alumina. Eight catalysts, identified hereinafter as Catalysts B through I, respectively, comprised supports of zirconium oxide and alumina. One catalyst, identified hereinafter as Catalyst J, had a support of zirconium oxide only.

For the preparation of the alumina support of Catalyst A, 200 gm of alumina hydrogel were dried in a vacuum oven at a temperature of 150° C. (302° F.). The dried material was then calcined in static air at a temperature of about 500° C. (932° F.) for 3 hours.

In the case of the 8 catalysts having the supports of zirconium oxide and alumina, i.e., Catalysts B through I, the supports contained different amounts of zirconium oxide. However, their preparations were similar. The amounts of the various ingredients that were employed in the preparation of these supports are presented in Table I hereinbelow. Each preparation was as follows:

A solution of zirconyl acetate was mixed with a slurry of alumina hydrogel. The solution of zirconyl acetate was prepared by dissolving the specified amount of zirconyl acetate in the specified amount of distilled water. The slurry of the alumina hydrogel was prepared by dissolving the specified amount of alumina hydrosol obtained from the American Cyanamide Company as PHF gamma-alumina hydrosol, in the specified amount of distilled water. A dilute solution of ammonium hydroxide was slowly added to the stirred mixture until the pH of the resulting material reached 8. The mixture was then heated to a temperature of about 80° C. (176° F.) while being stirred for an additional hour. The mixture was then filtered, washed with distilled water, and dried in a vacuum oven at a temperature of 150° C. (302° F.). The dried material was then calcined in static air at a temperature of about 500° C. (932° F.) for 3 hours.

For the preparation of the zirconia support of Catalyst J, 40 gm of zirconyl acetate were dissolved in 500 cc of distilled water. A dilute solution of ammonium hydroxide was slowly added to the stirred solution until the pH of the resulting mixture reached 8. The precipitated zirconia gel was then filtered, washed with distilled water and dried in a vacuum oven at a temperature of 150° C. (302° F.). The dried material was then calcined in static air at a temperature of about 500° C. (932° F.) for 3 hours.

Each support material was impregnated with iridium to provide the finished catalyst with 0.3 wt.% iridium. In each case, a 5-gm portion of the particular support material was impregnated with 7.5 cc of iridium-containing solution, which was made up by dissolving the 1.84 gm of iridium chloride [IrCl$_3$.3H$_2$O] in 500 cc of distilled water. The support material had been pulverized previously to a 14/20-mesh material, that is, a material that would pass through a 14-mesh screen (U.S. Sieve Series), but would be retained on a 20-mesh screen. Since the iridium solution is quickly reduced to a colloidal solution, the solution must be freshly made up and used immediately thereafter. In each case, the impregnation technique consisted of pouring the solution quickly upon the dried solid support material and permitting the mixture to stand overnight. The iridium was dispersed evenly over the particles of support material by means of this technique. After a period of approximately 8 hours, all of the iridium had been adsorbed on the support material and any excess clear liquid that was used for the impregnation was removed by decantation. The wet solid particles were then dried in a vacuum oven at 150° C. (302° F.) for 3 hours.

TABLE I

| PREPARATION OF SUPPORTS FOR CATALYSTS B THROUGH I | | | | | | | | |
|---|---|---|---|---|---|---|---|---|
| Catalyst | B | C | D | E | F | G | H | I |
| Zirconyl Acetate, gm[(1)] | 1.2 | 1.80 | 4.66 | 6.28 | 7.28 | 11.2 | 41.0 | 92 |
| with dist. $H_2O$, cc | 200 | 200 | 200 | 200 | 200 | 200 | 500 | 500 |
| Alumina Hydrosol, gm[(2)] | 200 | 180 | 200 | 190 | 150 | 160 | 200 | 150 |
| with dist. $H_2O$, cc | 500 | 500 | 500 | 500 | 500 | 500 | 500 | 500 |
| $ZrO_2$, wt. % | 3 | 5 | 10 | 15 | 20 | 25 | 50 | 75 |

[(1)] 1 gm equivalent to 0.55 gm $ZrO_2$
[(2)] 1 gm equivalent to 0.11 gm $Al_2O_3$

EXAMPLE II

Another catalyst comprisimg iridium on a support of zirconia and alumina was prepared. This catalyst is hereinafter identified as Catalyst K.

A support material made up of 98 wt.% zirconium oxide and 2 wt.% catalytically active alumina was obtained from the Harshaw Chemical Company. This support material was impregnated in the same manner as that described for the catalysts in Example I. The iridium chloride solution was prepared by dissolving 184 grams of iridium chloride in 500 cc of distilled water. A 7.5-cc portion of this solution was used to impregnate 5 grams of the support material, which had been pulverized into a 14/20-mesh material. This Catalyst K was prepared to contain 0.3 wt.% iridium.

EXAMPLE III

The above 11 catalysts that are described in Examples I and II were tested in a micro unit for their ability to convert normal-heptane.

The micro unit employs a horizontal reactor fabricated from a ¼-in. O.D. stainless steel tube, which reactor was 45.7 cm (18 inches) in length. For each test, a 0.25-gram sample of the particular catalyst was centrally located in the reactor. A plug of quartz wool was placed at each end of the catalyst bed in the reactor. The catalyst bed was approximately one inch in length. The reactor was heated by an electrical tubular furnace.

The normal-heptane feed that was employed in these tests was obtained from Phillips Petroleum Company and was pure grade normal-heptane. The hydrocarbon feed was delivered by a bubbler system whereby hydrogen was bubbled through the hydrocarbon at room temperature and was fed directly into the reactor under pressure.

The conditions for each of the tests were as follows: a total flow rate of hydrogen and normal-heptane of 40 cc/min, a pressure of 446 kPa (50 psig), a WHSV of 0.5 weight unit of normal-heptane per hour per weight unit of catalyst, and a mole ratio of hydrogen-to-normal-heptane of 75/1.

The total effluent from the reactor was depressurized and was analyzed by gas-chromatographic techniques while still in the vapor phase.

The results of these 11 tests, wherein the average catalyst bed temperature was 410° C. (770° F.), are presented hereinafter in Table II. Dehydrocyclization activity is defined as the mole percent of normal-heptane feed converted to toluene after 4 hours on stream. At the fourth hour, the activity had lined out to a constant conversion.

TABLE II

| EFFECT OF $ZrO_2$—$Al_2O_3$ COMPOSITION ON ACTIVITY | | |
|---|---|---|
| Test No. | Catalyst | Dehydrocyclization Activity |
| 1 | A | 0 |
| 2 | B | 0 |
| 3 | C | 24 |
| 4 | D | 12 |
| 5 | E | 6.5 |
| 6 | F | 2 |
| 7 | G | 0 |
| 8 | H | 1 |
| 9 | I | 6 |
| 10 | J | 15 |
| 11 | K | 24 |

The results presented in Table II are depicted in the accompanying figure. In this figure, the composition of the catalyst support is used as the abscissae and activity is plotted as the ordinates.

The curve in the accompanying figure shows that maximum activity was obtained when the support contained approximately 98 wt.% zirconium oxide. Those catalysts which contained less than 3% zirconium oxide, more than 25 wt.% zirconium oxide, but less than 50 wt% zirconium oxide, did not provide any appreciable activity. In view of these results, the support of the catalyst that is employed in the process of the present invention should comprise either about 3 wt.% to about 15 wt.% zirconia or at least 60 wt.% zirconia.

EXAMPLE IV

Five additional catalysts were either obtained or prepared.

The first of these was obtained from the American Cyanamid Company. It was a commercial reforming catalyst containing 0.43 wt.% platinum and 0.42 wt.% chlorine on gamma-alumina. This catalyst is hereinafter identified as Catalyst L.

A catalyst comprising iridium on a gamma-alumina support was prepared. This catalyst is identified hereinafter as Catalyst M. A 10-gram portion of PHF gamma-alumina obtained from the American Cyanamid Company was ground to a 14/20-mesh material. This material was impregnated with an iridium-containing solution, which was made up by dissolving 0.055 gram of $IrCl_3.3H_2O$ in 15 cc of distilled water. The solution was employed to impregnate the alumina by the technique described hereinabove in Example I.

A catalyst comprising iridium on a support of gamma-alumina and having been sulfided was prepared.

This catalyst is hereinafter identified as Catalyst N. The sulfiding was obtained by heating a 1-gram portion of Catalyst M in a flow of hydrogen for 1 hour at a temperature of 504° C. (940° F.). The flow of hydrogen was 50 cc/min. The material was then cooled to room temperature. A 100-cc portion of a gas mixture containing 1% hydrogen sulfide in hydrogen was passed over the catalyst at room temperature. All of the hydrogen sulfide was adsorbed onto the catalyst. This resulted in approximately 2.5 molecules of sulfur per atom of iridium on the catalyst. The catalyst containing the hydrogen sulfide was then heated to a temperature of 504° C. (940° F.) at a rate of 25° C./minute and was allowed to remain at that temperature for one hour.

A catalyst comprising iridium on a support of zirconium oxide and alumina was prepared. This catalyst is hereinafter identified as Catalyst O. Its preparation was similar to that of the preparations of the catalysts described in Example I. In this case, the solution of zirconyl acetate was prepared by dissolving 5.8 grams of zirconyl acetate in 500 cc of distilled water. The slurry of alumina hydrogel was prepared by mixing 500 grams of the alumina hydrosol obtained from the American Cyanamid Company with 1,000 cc of distilled water. Catalyst O was prepared to contain 0.3 wt.% iridium and the support was prepared to contain 5 wt.% zirconium oxide.

Another embodiment of the iridium on zirconium oxide-alumina catalyst was prepared. This catalyst was prepared similarly to that of Catalyst K, as described in Example II. It contained a support that was made up of 98 wt.% zirconium oxide and 2 wt.% alumina. This support was commercially obtained from the Harshaw Chemical Company. This catalyst is identified hereinafter as Catalyst P.

EXAMPLE V

Catalysts L through P were tested for their abilities to convert normal-heptane in Tests Nos. 12 through 16, respectively. The tests were conducted in a once-through micro unit. The reactor in this unit was a vertical reactor and this reactor was fabricated from a 3/8-in. O.D. stainless steel tube. The length of the reactor was 45.7 cm (18 inches). A 1-gram sample of catalyst was centrally located in the reactor. It was held in place by a stainless steel screen. The bed of the catalyst was approximately 2.54 cm (1 inch) in length. The reactor was heated by a split tubular electrical furnace.

The normal-heptane feed was delivered by a conventional Ruska pump. The hydrocarbon feed and a controlled flow of hydrogen were introduced into the reactor. Liquid product coming from the reactor was cooled with a water-cooled condenser and was collected in a Strahman gauge gas-liquid separator. The liquid product was analyzed gas-chromatographically.

Each catalyst was pretreated in situ for 1 hour in hydrogen at a temperature of 504° C. (940° F.) at a hydrogen flow rate of 50 cc/min.

Liquid samples were withdrawn periodically over the length of each test, weighed, and gas-chromatographically analyzed. In the case of each sample, the "liquid yield" was defined as the weight of liquid sample divided by the weight of feed times 100. The "weight percent aromatic produced from the original feed" was defined as the weight percent aromatics in the liquid samples times the percent of the liquid yield divided by 100.

The operating conditions for each of the following tests included a temperature of 504° C. (940° F.), a pressure of 1,067 kPa (140 psig), a mole ratio of hydrogen-to-hydrocarbon of 3:1, and a WHSV of 5.5 weight units of hydrocarbon per hour per weight unit of catalyst.

The results of the test described in this example are presented hereinbelow in Table III.

TABLE III
DATA FROM TESTS NOS. 12 THROUGH 16

| Test No. | Catalyst | Sample Number | Average Sample Time (Hrs) | Wt. % Liquid Yield | Wt. % Aromatics in Liquid Product | Wt. % Aromatics Produced From Original Feed |
|---|---|---|---|---|---|---|
| 12 | L | 1 | 1.5 | 78.6 | 30.7 | 24.1 |
|  |  | 2 | 4.5 | 75.5 | 23.0 | 17.4 |
|  |  | 3 | 9 | 89.5 | 17.6 | 15.7 |
|  |  | 4 | 15 | 76.3 | 14.9 | 11.4 |
|  |  | 5 | 20.5 | 81.6 | 12.4 | 10.1 |
|  |  | 6 | 24.5 | 81.1 | 11.5 | 9.3 |
| 13 | M | 1 | 1.75 | 55.3 | 23.7 | 13.1 |
|  |  | 2 | 4.5 | 57.5 | 16.0 | 9.2 |
|  |  | 3 | 9.5 | 63.6 | 14.4 | 9.2 |
|  |  | 4 | 15.5 | 59.6 | 14.0 | 8.3 |
|  |  | 5 | 21 | 64.1 | 11.7 | 7.5 |
| 14 | N | 1 | 1 | 82.0 | 27.1 | 22.2 |
|  |  | 2 | 2.75 | 78.2 | 17.9 | 14.0 |
|  |  | 3 | 9 | 73.8 | 15.3 | 11.3 |
|  |  | 4 | 15 | 84.0 | 10.7 | 9.0 |
|  |  | 5 | 20.5 | 81.5 | 9.9 | 8.1 |
| 15 | O | 1 | 0.75 | 73.8 | 33.6 | 24.8 |
|  |  | 2 | 2.75 | 79.1 | 26.1 | 20.7 |
|  |  | 3 | 7 | 76.9 | 19.8 | 15.2 |
|  |  | 4 | 13 | 79.9 | 14.3 | 11.4 |
|  |  | 5 | 18.5 | 85.5 | 11.4 | 9.7 |
|  |  | 6 | 23 | 81.3 | 12.7 | 10.3 |
| 16 | P | 1 | 1 | 72.9 | 19.8 | 14.4 |
|  |  | 2 | 3.5 | 70.1 | 16.9 | 11.8 |
|  |  | 3 | 8 | 73.6 | 13.2 | 10.0 |
|  |  | 4 | 14 | 80.8 | 10.4 | 8.4 |
|  |  | 5 | 19.25 | 69.4 | 9.4 | 6.5 |
|  |  | 6 | 22.5 | 76.6 | 8.9 | 6.8 |

The results from the Tests 12 through 16 indicate that a catalayst comprising iridium on a support of 5 wt.% zirconia and 95 wt.% alumina provides a very high amount of aromatics. Moreover, the wt.% liquid yields furnished by the catalysts comprising iridium on a support of alumina and zirconium oxide were very high and compared favorably with the yields provided by the platinum-on-alumina catalyst, Catalyst L.

EXAMPLE VI

Catalysts N, O, and P were regenerated and the regenerated catalysts were tested for their abilities to convert normal-heptane.

The regeneration of each catalyst was carried out as follows: After the prior test, the catalyst was cooled in flowing hydrogen to room temperature. The hydrogen flow rate was 50 cc/min. The catalyst was then heated to a temperature of 504° C: (940° F.) in the presence of a mixture of 20% oxygen and 80% nitrogen and was then calcined at that temperature for 1 hour. The catalyst was cooled to room temperature and subsequently reheated in hydrogen flowing at a flow rate of 50 cc/min.

The tests were conducted as described in Example V hereinabove. These tests are identified hereinafter as Tests. No. 17 through 19.

The results obtained from Tests Nos. 17 through 19 are presented hereinbelow in Table IV.

TABLE IV

DATA FROM TESTS NOS. 17 THROUGH 19

| Test No. | Catalyst | Sample Number | Average Sample Time Hrs. | Wt. % Liquid Yield | Wt. % Aromatics in Liquid Product | Wt. % Aromatics Produced From Original Feed |
|---|---|---|---|---|---|---|
| 17 | N | 1 | 1 | 68.8 | 11.6 | 8.0 |
|  | Regen. | 2 | 5 | 75.1 | 10.1 | 7.6 |
|  |  | 3 | 12 | 80.3 | 8.2 | 6.7 |
| 18 | O | 1 | 1 | 78.4 | 23.5 | 18.4 |
|  | Regen. | 2 | 5 | 75.0 | 17.8 | 13.3 |
|  |  | 3 | 11 | 85.5 | 14.9 | 12.9 |
| 19 | P | 1 | 0.5 | 72.9 | 17.4 | 12.3 |
|  | Regen. | 2 | 4 | 81.6 | 13.4 | 10.9 |
|  |  | 3 | 10 | 84.1 | 10.7 | 8.5 |

These results suggest that embodiments of the catalyst of the present invention, i.e., catalysts comprising iridium on a support of alumina and zirconia, can be regenerated successfully and will outperform a regenerated catalyst containing iridium on an alumina support, which has been sulfided previously.

What is claimed is:

1. A catalyst for the reforming of hydrocarbon streams, which catalyst consists essentially of iridium as a hydrogenation component on a support of zirconia and alumina, said support comprising zirconia in an amount that falls within the range having a lower value that is greater than 3 wt.% and an upper value of about 15 wt.% zirconia or in an amount that is at least 60 wt.% zirconia.

2. The catalyst of claim 1, wherein said support comprises zirconia in an amount that falls within the range having a lower value that is greater than 3 wt.% and an upper value of about 10 wt.% zirconia or in an amount that is at least 90 wt.% zirconia.

3. The catalyst of claim 1, wherein the iridium is present in an amount of about 0.05 wt.% to about 1.5 wt.%, calculated as the metal and based upon the total weight of said catalyst.

4. The catalyst of claim 2, wherein the iridium is present in an amount of about 0.05 wt.% to about 1.5 wt.%, calculated as the metal and based upon the total weight of said catalyst.

* * * * *

UNITED STATES PATENT OFFICE
CERTIFICATE OF CORRECTION

Patent No. 4,240,934          Dated  December 23, 1980

Inventor(s)   Rodney L. Mieville

It is certified that error appears in the above-identified patent and that said Letters Patent are hereby corrected as shown below:

Column 3, line 2, "conponent" should be --component--.

Column 4, line 47, "component" should be --component comprises--.

Signed and Sealed this

Thirteenth Day of July 1982

[SEAL]

Attest:

Attesting Officer

GERALD J. MOSSINGHOFF
Commissioner of Patents and Trademarks